United States Patent
Clark et al.

(10) Patent No.: US 10,389,693 B2
(45) Date of Patent: Aug. 20, 2019

(54) KEYS FOR ENCRYPTED DISK PARTITIONS

(71) Applicant: Hewlett Packard Enterprise Development LP, Houston, TX (US)

(72) Inventors: Robert Graham Clark, Bristol (GB); Timothy John Kelsey, Bristol (GB); Bryan Stephenson, Alviso, CA (US); Douglas Chivers, Bristol (GB)

(73) Assignee: Hewlett Packard Enterprise Development LP, Houston, TX (US)

( * ) Notice: Subject to any disclaimer, the term of this patent is extended or adjusted under 35 U.S.C. 154(b) by 242 days.

(21) Appl. No.: 15/244,774

(22) Filed: Aug. 23, 2016

(65) Prior Publication Data

US 2018/0063101 A1 Mar. 1, 2018

(51) Int. Cl.
*H04L 29/06* (2006.01)
*G06F 12/14* (2006.01)

(52) U.S. Cl.
CPC ........ *H04L 63/061* (2013.01); *G06F 12/1408* (2013.01)

(58) Field of Classification Search
CPC ............... H04L 63/061; G06F 12/1408; G06F 2212/1052
USPC ....................................................... 713/171
See application file for complete search history.

(56) References Cited

U.S. PATENT DOCUMENTS

| | | | | |
|---|---|---|---|---|
| 5,224,166 A * | 6/1993 | Hartman, Jr. | ....... | G06F 12/0802 380/277 |
| 6,078,665 A * | 6/2000 | Anderson | ............... | H04L 9/001 380/28 |
| 6,226,750 B1 * | 5/2001 | Trieger | .................. | H04L 29/06 380/264 |
| 6,986,052 B1 * | 1/2006 | Mittal | ................. | G06F 12/1441 713/190 |
| 7,107,462 B2 | 9/2006 | Fransdonk | | |
| 7,150,014 B2 * | 12/2006 | Graupner | ................. | G06F 8/71 717/174 |
| 7,761,704 B2 * | 7/2010 | Ho | ......................... | H04N 5/913 380/201 |
| 7,941,401 B2 * | 5/2011 | Okamoto | .......... | G06F 17/30566 707/636 |
| 8,171,309 B1 * | 5/2012 | Poo | ..................... | G06F 11/3648 713/182 |
| 8,181,028 B1 * | 5/2012 | Hernacki | ................ | G06F 21/31 380/277 |
| 8,190,921 B1 * | 5/2012 | Harwood | ............ | G06F 21/6209 713/189 |

(Continued)

OTHER PUBLICATIONS

Linda Musthaler, Cloud Encryption: Control Your Own Keys in a Separate Storage Vault, Network World, IT Best Practices http://www.networkworld.com/article/2170564/cloud-computing/cloud-encryption-control-your-own-keys-in-a-separate-storage-vault.html, Retrieved Aug. 23, 2016, 5 Pgs.

(Continued)

*Primary Examiner* — Shahriar Zarrineh
(74) *Attorney, Agent, or Firm* — Sheppard Mullin Richter & Hampton LLP (57) ABSTRACT

Examples described herein include receiving a key request from a requestor, determining a validity of the key request, and sending the key to the requestor based on the determination of the validity of the key request. In some examples, the key request is for a key to an encrypted disk partition of a protected computing device and comprises a unique identifier associated with the encrypted disk partition.

15 Claims, 5 Drawing Sheets

(56) References Cited

U.S. PATENT DOCUMENTS

| | | | | |
|---|---|---|---|---|
| 8,477,941 B1* | 7/2013 | Dhanoa | | H04W 36/0038 380/270 |
| 8,811,619 B2* | 8/2014 | Khatri | | G06F 21/602 380/279 |
| 2003/0026431 A1 | 2/2003 | Hammersmith | | |
| 2003/0065620 A1* | 4/2003 | Gailey | | G06Q 30/02 705/51 |
| 2003/0093429 A1* | 5/2003 | Nishikawa | | G06F 16/284 |
| 2005/0114686 A1* | 5/2005 | Ball | | G06F 21/78 713/193 |
| 2006/0075236 A1* | 4/2006 | Marek | | G06F 21/54 713/171 |
| 2006/0075259 A1* | 4/2006 | Bajikar | | H04L 63/0428 713/189 |
| 2006/0132822 A1* | 6/2006 | Walmsley | | G06F 12/1408 358/1.14 |
| 2006/0143454 A1* | 6/2006 | Walmsley | | G06F 21/85 713/170 |
| 2008/0052756 A1* | 2/2008 | Morishige | | H04L 63/0227 726/1 |
| 2009/0041249 A1* | 2/2009 | Tanaka | | G06Q 20/3829 380/277 |
| 2009/0177647 A1* | 7/2009 | Oliver | | G06F 17/30306 |
| 2009/0282266 A1 | 11/2009 | Fries et al. | | |
| 2009/0319801 A1* | 12/2009 | Aciicmez | | H04L 9/0872 713/189 |
| 2010/0005301 A1* | 1/2010 | Asano | | G06F 21/10 713/171 |
| 2010/0023747 A1* | 1/2010 | Asnaashari | | G06F 21/34 713/150 |
| 2010/0088525 A1* | 4/2010 | Ureche | | G06F 21/72 713/193 |
| 2010/0106954 A1* | 4/2010 | Muchsel | | G06F 21/71 713/2 |
| 2010/0266132 A1 | 10/2010 | Bablani et al. | | |
| 2010/0323664 A1* | 12/2010 | Sivaram | | H04M 1/66 455/411 |
| 2011/0187771 A1* | 8/2011 | Helterline | | B41J 29/38 347/6 |
| 2012/0151223 A1* | 6/2012 | Conde Marques | | G06F 21/575 713/193 |
| 2012/0260023 A1* | 10/2012 | Nagai | | G06F 21/31 711/103 |
| 2013/0080787 A1* | 3/2013 | Lee | | H04L 9/3226 713/183 |
| 2013/0268771 A1* | 10/2013 | Blankenbeckler | | H04L 9/0866 713/189 |
| 2013/0305039 A1 | 11/2013 | Gauda | | |
| 2014/0019753 A1* | 1/2014 | Lowry | | H04L 63/062 713/155 |
| 2014/0040886 A1* | 2/2014 | Coles | | G06F 9/4401 718/1 |
| 2014/0115346 A1* | 4/2014 | Ekberg | | G06F 21/10 713/193 |
| 2014/0122866 A1 | 5/2014 | Haeger et al. | | |
| 2014/0122901 A1* | 5/2014 | Bilke | | G06F 21/60 713/193 |
| 2014/0173282 A1* | 6/2014 | Pascariello | | G06F 21/6218 713/171 |
| 2014/0181521 A1* | 6/2014 | Hemphill | | H04L 9/0819 713/171 |
| 2014/0359276 A1* | 12/2014 | Resch | | H04L 63/0457 713/153 |
| 2015/0040235 A1* | 2/2015 | Byrne | | H04L 63/0457 726/26 |
| 2015/0082053 A1* | 3/2015 | Sano | | G06F 12/1408 713/193 |
| 2015/0310214 A1* | 10/2015 | Buhler | | G06F 21/575 713/2 |
| 2015/0321214 A1 | 11/2015 | Cox et al. | | |
| 2015/0371055 A1* | 12/2015 | Park | | G06F 21/6218 713/165 |
| 2016/0292087 A1* | 10/2016 | Axnix | | G06F 21/575 |
| 2016/0364583 A1* | 12/2016 | Benoit | | G06F 21/79 |
| 2017/0032108 A1* | 2/2017 | Amaral Cid | | G06F 21/10 |
| 2017/0083710 A1* | 3/2017 | Chapman, III | | G06F 21/6218 |
| 2017/0139842 A1* | 5/2017 | Moriguchi | | G06F 21/78 |
| 2017/0171197 A1* | 6/2017 | Alexander | | H04L 67/20 |
| 2017/0206372 A1* | 7/2017 | Jung | | G06F 17/30864 |

OTHER PUBLICATIONS

Red Hat, "Chapter 29. Disk Encryption Guide", available online at https://access.redhat.com/documentation/en-us/red_hat_enterprise_linux/5/html/installation_guide/disk_encryption_guide, Copyright 2014, 368 pages.

\* cited by examiner

KEYS FOR ENCRYPTED DISK PARTITIONS

BACKGROUND

Non-volatile memory (e.g., hard drives) of computing devices may be encrypted to enhance the security of the computing devices.

BRIEF DESCRIPTION OF THE DRAWINGS

The following detailed description references the drawings, wherein.

DETAILED DESCRIPTION

Due to security and/or compliance requirements, an enterprise may choose to encrypt a part or all of the data stored in the non-volatile memory (e.g., hard drives, etc.) of its computing device. Encryption converts the stored data into a form that is not easily readable by a processing resource of a computing device. In some examples, encryption may require a cryptographic key (e.g., a data encryption key, etc.).

For a processing resource to access the encrypted portion, the original key is needed. Thus, in some examples, a computing device that depends on accessing an encrypted memory portion in order to accomplish a process may not proceed without the key to the encrypted portion.

For example, computing devices running a Linux operating system may have a full disk encryption. This is when an entirety of its non-volatile memory is encrypted, except for a small pre-boot section. The computing device may be partitioned and encrypted at initial provisioning and boot. When the computing device is re-booted, the keys to the encrypted partitions are needed for the computing device to boot. Without the keys, the Linux computing device is in a waiting state and is unable to perform its intended operations.

In some examples, keys may be given to a computing device requesting a key by an administrator. This may be accomplished through, for example, the insertion of a universal serial bus flash drive with the key or the manual input of a key through a user terminal, etc. However, reliance on the manual intervention of a system administrator is inefficient for a large scale network because numerous networked computing devices may require keys at the same time. A system administrator may not be able to handle all requests at once or as quickly as is needed by the computing devices. In some situations, the lag time between a request and a key delivery may result in many computing devices to go a limbo state, or a "crypto-DoS" (denial of service), where the computing device is not performing its intended purpose. This delays functions that are supported by the computing devices and may cause network failures. This may also be expensive and inefficient for the enterprise. Additionally, reliance on the manual intervention of a system administrator may also be insecure, as it may require physical access to the computing device.

The present invention addresses these technical challenges by enabling a computing device to store keys for encrypted disk partitions and provide the keys to a host server upon request. The computing device may determine a validity of the key request and send the key to the host server based on the validity determination. Thus, examples disclosed herein allow for a centralized key storage and retrieval system that handles key requests without the intervention of a system administrator. This decreases the inefficient waiting period for computing devices that need access to encrypted disk partitions.

In some examples, a computing device is provided with a non-transitory machine-readable storage medium. The non-transitory machine-readable storage medium comprises instructions executable by a processing resource. The instructions comprise instructions to receive a key request from a requestor, instructions to determine a validity of the key request, and instructions to send the key request to the requestor based on the determination of the validity of the key request. In some examples, the key request is for a key to an encrypted disk partition of a protected computing device and comprises a unique identifier associated with the encrypted disk partition.

In some examples, a computing device is provided comprising an encryption engine, a registration engine, and a decryption engine. The encryption engine is to generate a key for an encrypted disk partition of the computing device and to generate a unique identifier associated with the encrypted disk partition. The registration engine is to send a registration request to a second computing device and to send the key and unique identifier to the second computing device. The decryption engine is to send a key request to the second computing device and to receive the key from the second computing device.

In some examples, a computing device is provided comprising a registration engine to receive a registration request from a protected computing device and to receive a key for an encrypted disk partition of the protected computing device and a unique identifier associated with the encrypted disk partition. The computing device may also comprise a request engine to receive a key request from a requestor, a validation engine to determine the validity of the key request and to send the key based on the determination of the validity of the key request, and a memory. In some examples, the registration request comprises information identifying the protected computing device. In some examples, the key request comprises the unique identifier and information identifying the requestor. In some examples, the memory is to store the key, information identifying the protected computing device, and the unique identifier associated with the encrypted disk partition.

Figure 1:
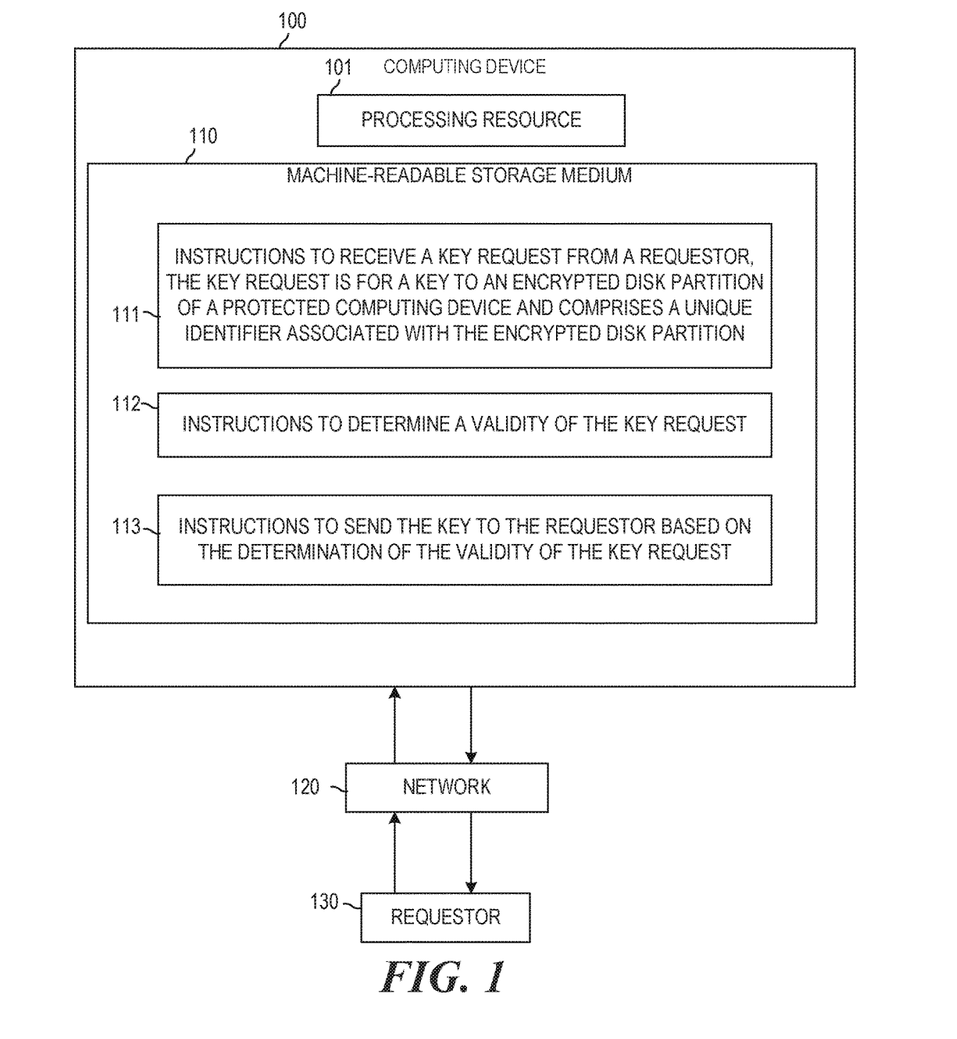
FIG. 1 is a block diagram of a computing device to send to a requestor a key for an encrypted disk partition, according to some examples.

Referring now to the figures, FIG. 1 is a block diagram of a computing device 100 to send to a requestor a key for an encrypted disk partition. As used herein, a "computing device" may be a server, computer networking device, chip set, desktop computer, workstation, or any other processing device or equipment. In some examples, computing device 100 may communicate with at least one requestor 130.

Computing device 100 includes a processing resource 101 and a machine-readable storage medium 110. Machine-readable storage medium 110 may be in the form of non-transitory machine-readable storage medium, such as suitable electronic, magnetic, optical, or other physical storage apparatus to contain or store information such as instructions 111, 112, 113, related data, and the like.

As used herein, "machine-readable storage medium" may include a storage drive (e.g., a hard drive), flash memory, Random Access Memory (RAM), any type of storage disc (e.g., a Compact Disc Read Only Memory (CD-ROM), any other type of compact disc, a DVD, etc.) and the like, or a combination thereof. In some examples, a storage medium may correspond to memory including a main memory, such as a Random Access Memory, where software may reside during runtime, and/or a secondary memory. The secondary memory can, for example, include a nonvolatile memory where a copy of software or other data is stored.

In the example of FIG. 1, instructions 111, 112, and 113 are stored (e.g., encoded) on storage medium 110 and are executable by processing resource 101 to implement functionalities described herein in relation to FIG. 1. In some examples, storage medium 110 may include additional instructions, like, for example, the instructions to implement some of the functionalities described in relation to computing device 200 of FIG. 2. In some examples, the functionalities of any of the instructions of storage medium 110 may be implemented in the form of electronic circuitry, in the form of executable instructions encoded on machine-readable storage medium, or a combination thereof.

Processing resource 101 may, for example, be in the form of a central processing unit (CPU), a semiconductor-based microprocessor, a digital signal processor (DSP) such as a digital image processing unit, other hardware devices or processing elements suitable to retrieve and execute instructions stored in a storage medium, or suitable combinations thereof. The processing resource can, for example, include single or multiple cores on a chip, multiple cores across multiple chips, multiple cores across multiple devices, or suitable combinations thereof. The processing resource can be functional to fetch, decode, and execute instructions 111, 112, and 113, as described herein.

In some examples, and as shown in FIG. 1, computing device 100 is communicatively coupled to requestor 130 through a communication network 120. In some examples, communication network 120 may be a wireless network, a wired network, or a combination thereof. In some examples, network 120 may be an individual network or a collection of many such individual networks interconnected with each other and functioning as a single large network (e.g., the Internet or an intranet). In some examples, communication network 120 may be implemented as a local area network (LAN), wide area network (WAN), etc. In other examples, computing device 100 may be directly coupled to requestor 130.

Instructions 111 may be executable by processing resource 101 such that computing device 100 receives a key request from requestor 130. The key request is for a key to an encrypted disk partition of a protected computing device. In some examples, the key request comprises a unique identifier associated with the encrypted disk partition.

Requestor 130 may be a computing device, as used herein. Thus, for example, requestor 130 may be a host server for an enterprise. In some examples, requestor 130 may comprise a server running a specific operating system, such as a Linux operating system (i.e. a Linux server). Additionally, in some examples, requestor 130 may be a computing device that relies upon an encrypted disk partition for an intended functionality (e.g., booting up from an encrypted disk partition, etc.). In these examples, requestor 130 may not have the key to access the encrypted disk partition and thus may request the key from computing device 100.

As used herein, a "disk" may include non-volatile memory (i.e. secondary memory) including, but not limited to, hard drive, flash memory, any type of storage disc (e.g., a Compact Disc Read Only Memory (CD-ROM), any other type of compact disc, a DVD, etc.). Thus, as used herein, an encrypted disk partition includes a portion of a disk in which access to the portion (e.g., to read or write data) is gated by a key. Thus, the portion of disk is not easily readable or writable by a processing resource without the key. This may deter unauthorized access to that portion. The key is used to encrypt the encrypted disk partition and to decrypt the encrypted disk partition and may be used by an algorithm that converts data from encrypted to original form and data from original to encrypted form. In some examples, the key is a Data Encryption Key (DEK). A disk may comprise at least one encrypted disk partition (e.g., one encrypted disk partition, multiple encrypted disk partitions, etc.). Each disk partition, while represented by its own unique identifier, may be encrypted by a different, a similar, or the same key.

As used herein, a protected computing device includes a computing device with a disk that has an encrypted disk partition. Thus, in some examples, the protected computing device may have certain portions of its disk encrypted. In other examples, the protected computing device may have a full disk encryption. In some examples, the protected computing device is a host server. In some examples, the protected computing device, like the requestor, uses a specific type of operating system (e.g., a Linux server). In some examples, the disk of the protected computing device may be partitioned and encrypted during the initial provisioning and boot of the protected computing device.

As discussed above, instructions 111 may be executable such that computing device 100 receives a key request from requestor 130. As used herein, a key request includes a signal indicating to computing device 100 that requestor 130 is in need of a key for an encrypted disk partition. In some examples, the key request may comprise a unique identifier associated with the encrypted disk partition. As used herein, a unique identifier includes a string value that may be used to label the encrypted disk partition. In some examples, the unique identifier may be an alphanumerical string. In other examples, the unique identifier may be a numeric string. In some examples, the unique identifier may include a universally unique identifier (UUID). A UUID comprises a 128-bit value and may be used across multiple computing devices to uniquely reference individual components associated with each computing device without significant coordination by a central system. Thus, a specific UUID may be used to identify a specific encrypted disk partition with reasonable confidence that the specific UUID represents the specific encrypted disk partition and no other encrypted disk partition. For example, an encrypted disk partition of protected computing device A may have a UUID of X, and an encrypted disk partition of protected computing device B may have a UUID of Y. X and Y are unique to their respective encrypted disk partitions even though X and Y are generated by different computing devices. In other words, there is a low possibility that computing device B would generate the UUID of X to identify another encrypted disk partition even though computing device B does not know that computing device A has already used X.

Different types of encrypted communication protocols may be used by computing device 100 and requestor 130 to send and receive the key request, including, but not limited to transport layer security (TLS), Secure Sockets Layer (SSL), Internet Protocol Security (IPSec), etc. With these connections, computing device 100 and requestor 130 take steps to establish privacy before the data exchange. For example, with TLS, computing device 100 and requestor 130 may exchange and negotiate cipher suites (ciphers and hash functions) to be used to encrypt data that is exchanged.

Accordingly, instructions 111 may include instructions that are executable by processing resource 101 such that computing device 100 establishes a cryptographic connection with requestor 130. Thus, in examples using TLS, instructions 111 may include instructions to pick a cipher and a hash function from a list of cipher and hash functions that are provided by requestor 130.

In some examples, instructions 111 also include instructions to authenticate the requestor 130. For example, in a TLS protocol, instructions 111 may include instructions to send a CertificateRequest message to requestor 130 (to ask for the requestor's certificate). Instructions 111 may also include instructions to receive the requestor's certificate, which may include information that identifies the requestor 130. Instructions 111 may include instructions to validate the Certificate received by computing device 100 using the TLS protocol.

Instructions 112 may be executable by processing resource 101 such that computing device 100 determines a validity of the key request. As used herein, a validity of the key request may include a determination that the requestor is authorized to obtain a key for the unique identifier included in the key request. As used herein, a validity of the key request may also include a determination that the requestor is unauthorized to obtain a key for the unique identifier included in the key request.

In some examples, instructions 112 may include instructions executable by processing resource 101 to determine an identity of the requester. As discussed above, computing device 100 may receive information that identifies the requestor 130. Thus, instructions 112 may allow processing resource 101 to use this information to determine the identity of the requestor 130. In some examples, this may include comparing the information identifying the requester 130 to information stored by computing device 100 that identifies a protected computing device. Responsive to the determination that the information identifying the requestor 130 matches the information identifying the protected computing device, instructions 112 may determine that the identity of the requester is the same as the protected computing device.

Thus, for example, protected computing device A may have an encrypted disk partition associated with UUID ABC. Computing device 100 may store the key for the encrypted disk partition associated with UUID ABC (e.g., by a registration of protected computing device A, etc.). Requester B may request the key for encrypted disk partition associated with UUID ABC by sending a key request for UUID ABC to computing device 100. Upon receipt of the request, computing device 100 does not yet know whether the key request from requester B is a valid key request. Computing device 100 may compare the information identifying requestor B with the information identifying protected computing device A. Responsive to the determination that the two sets of information are the same, computing device 100 determines that requester B is the same computing device as protected computing device A and is thus a registered protected computing device. Based, at least in part, on this determination, computing device 100 may determine that the key request for UUID ABC from requester B is valid.

In some examples, instructions 112 may include instructions executable by processing resource 101 to determine that the unique identifier included in the key request is associated with the requester. In other words, instructions 112 may allow processing resource 101 to determine that the unique identifier was registered from the same computing device as the requester. For example, protected computing device A may be associated with UUID ABC and protected computing device B may be associated with UUIDs DEF and GHI. Requester C may request keys for all three UUIDs: ABC, DEF, and GHI. Instructions 112 may allow processing resource 101 to determine that while the requester C is identified as a registered protected computing device (as discussed above), requester C is not associated with encrypted disk partitions associated with UUIDs DEF and GHI. Thus, processing resource 101 may determine that the key request from requester C for UUIDs DEF and GHI is not a valid key request.

In some examples, instructions 112 may include instructions executable by processing resource 101 to determine a validity of the key request for a specific unique identifier based, at least in part, on a number of previous key requests including the same unique identifier. As used herein, "a number" may include a singular (one) previous key request and multiple (two, three, etc.) previous key requests.

In some examples, a number of previous key requests include the total count of previous key requests (5, 10, 100, 1000, etc. total requests). In some examples, the count may be over a specific time frame (e.g., a count of key requests involving the unique identifier over the previous thirty seconds, etc.). Based on a count of previous key requests, instructions 112 may allow processing resource 101 to determine a validity of a key request. For example, processing resource 101 may determine that a key request is not valid because there have been numerous requests for the same unique identifier over a time unit (e.g., 500 requests within the last 5 seconds).

In some examples, the total count of requests or frequency of requests for a certain unique identifier may be linked to a specific requestor. For example, a booting computing device may boot up with a certain frequency. A requestor that exceeds this frequency in asking for a specific unique identifier may not be a booting computing device but a bad actor that is trying to emulate the protected computing device and access the keys of the protected computing device.

In some examples, a number of previous key requests may also include characteristics and patterns of the previous key requests. For example, instructions 112 may allow processing resource 101 to take into account a frequency of requests for the same unique identifier. For example, if there have been 10 total previous requests for a UUID that have occurred over 30 minutes, the frequency would be ⅓ requests per minute. In yet some examples, a frequency may be determined over a specific time period. For example, there have been 10 total previous requests over 30 minutes for a UUID but the last 9 have occurred within the last two seconds, the instructions 112 may determine that a frequency is 4.5 requests per second (effectively ignoring the first request). As another example, instructions 112 may also allow processing resource 101 to take into account a pattern of the previous key request. For example, a computing device that is in a normal boot-up process may require keys to partitions that are non-linear. However, a requestor 130 that is requesting UUIDs in a linear fashion is not representative of the normal boot-up process. Thus, based, at least in part, on the pattern of previous key requests for the unique identifier, processing resource 101 may determine that the current key request for the unique identifier is not valid.

Instructions 113 may be executable by processing resource 101 such that computing device 100 sends the key to the requestor 130 based on the determination of the validity of the key request. In some examples, the key may be sent to the requestor 130 over the encrypted communication session used to receive the key request. In some examples, computing device 100 may store the key associated with the unique identifier on a memory of computing device 100 (not shown in FIG. 1). This memory may be implemented by machine-readable storage medium 110 or may be separate from machine-readable storage medium 110 but accessible to processing resource 101.

In some examples, the memory may be implemented by a hardware security device. As used herein, a hardware security device (i.e. hardware security module (HSM)) may include a physical computing device that provides a dedicated hardware device to carry out cryptographic operations. In some examples, the hardware security device may include a plug-in card or an external device that connects directly to computing device 100. In some examples, the hardware security device may provide tamper evidence (logging and alerting, etc.) and tamper resistance (e.g., deleting keys upon a detection of tamper, etc.) In some examples, hardware security device may comprise multiple physical hardware security devices clustered together. In some examples, the memory may be implemented by a database structure.

Thus, in some examples, instructions 113 may include instructions executable by processing resource 101 such that computing device 100 fetches the key for the unique identifier in the key request from memory.

While computing device 100 of FIG. 1 is described in relation to one requestor, computing device 100 may communicate with and handle numerous key requests from numerous requestors.

Figure 2:
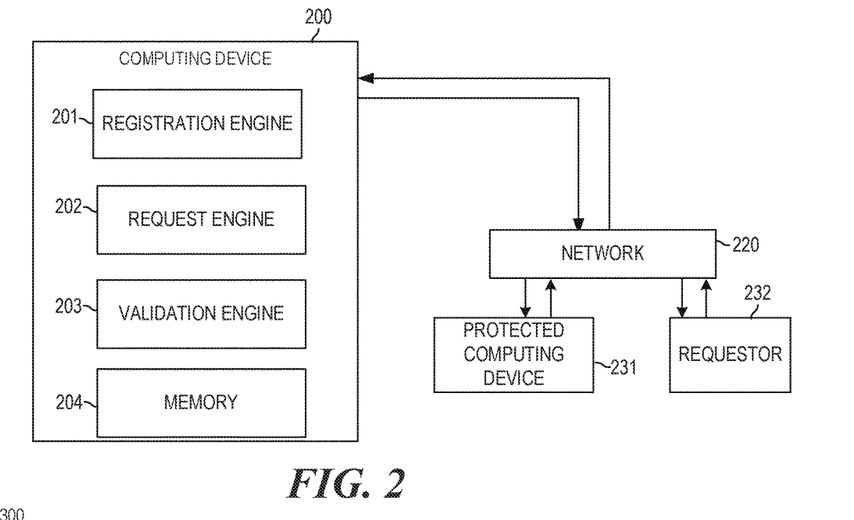
FIG. 2 is a block diagram of a computing device to register a key received from a protected computing device, according to some examples.

Computing device 100 of FIG. 1, which is described in terms of processors and machine-readable storage mediums, may include one or more structural or functional aspects of computing device 200 of FIG. 2, which are described in terms of functional engines containing hardware and software. For example, computing device 100 may include instructions to register a protected computing device over an encrypted communication session (e.g., TLS, etc.) The description below with respect to registration engine of computing device 200 is also applicable to instructions to register a protected computing device.

FIG. 2 is a block diagram of a computing device 200 to register a key received from a protected computing device. Computing device 200, like computing device 100, may be a server, computer networking device, chip set, desktop computer, workstation, or any other processing device or equipment. In some examples computing device 200 may communicate with a protected computing device 231 and a requestor 232 over network 220.

Computing device 200 includes registration engine 201, request engine 202, validation engine 203, and memory 204. Each of these aspects of computing device 200 will be described below. Other engines may be added to computing device 200 for additional or alternative functionality. Engines 201, 202, and 203 may interface with memory 204. Memory 204 may be a machine-readable storage medium of computing device 200.

Each of engines 201, 202, 203, and any other engines, may be any combination of hardware (e.g., a processor such as an integrated circuit or other circuitry) and software (e.g., machine or processor-executable instructions, commands, or code such as firmware, programming, or object code) to implement the functionalities of the respective engine. Such combinations of hardware and programming may be implemented in a number of different ways. A combination of hardware and software can include hardware (i.e., a hardware element with no software elements), software hosted at hardware (e.g., software that is stored at a memory and executed or interpreted at a processor), or hardware and software hosted at hardware. Additionally, as used herein, the singular forms "a," "an," and "the" include plural referents unless the context clearly dictates otherwise. Thus, for example, the term "engine" is intended to mean at least one engine or a combination of engines. In some examples, computing device 200 may include additional engines not shown in FIG. 2.

Each engine of computing device 200 can include at least one machine-readable storage mediums (for example, more than one) and at least one processing resource (for example, more than one). For example, software that provides the functionality of engines on computing device 200 can be stored on a memory of a computer to be executed by a processing resource of the computer. In some examples, each engines of computing device 200 may include hardware in the form of a microprocessor on a single integrated circuit, related firmware, or other software for allowing microprocessor to operatively communicate with other hardware of computing device 200.

Registration engine 201 is an engine of computing device 200 that includes a combination of hardware and software that allows computing device 200 to receive a registration request from protected computing device 231. As used herein, a registration request is a signal indicating to computing device 200 that a computing device has a key to an encrypted disk partition for computing device 200.

In some examples, registration engine 201 may allow computing device 200 to establish an encrypted communication session with protected computing device 231. Non-limiting examples of encrypted protocols that may be used include TLS, SSL, IPSec, etc.

As discussed above, encrypted communication protocols like TLS, SSL, IPSec, etc., allow registration engine 201 and protected computing device 231 to take steps that establish the privacy of the connection before the exchange. For example, with TLS, registration engine 201 may allow computing device 200 to exchange and negotiate cipher suites (ciphers and hash functions) to be used to encrypt data exchanged. Accordingly, registration engine 201 may allow computing device 200 to pick a cipher and hash function from a list of cipher and hash functions provided by protected computing device 231.

In some examples, the registration request received by registration engine 201 may include information identifying protected computing device 231 from which the registration request is coming from.

Thus, in some examples, as part of receiving the registration request, registration engine 201 may allow computing device 200 to send a CertificateRequest message to protected computing device 231 to ask for and receive a certificate from protected computing device 231. The certificate may include information that identifies protected computing device 231. Registration engine 201 may also allow computing device to receive a key for an encrypted disk partition of the protected computing device and a unique identifier associated with the encrypted disk partition. The receiving of the key and the unique identifier may be over the encrypted communication session.

Registration engine 201 may allow computing device 200 to store the key for the encrypted disk partition and the unique identifier associated with the encrypted disk partition in memory 204. Registration engine 201 may also allow computing device 200 to store the information identifying the protected information in a manner that associates it to the unique identifier such that computing device 200 may later determine that the unique identifier is from the protected computing device.

While memory 204 is shown in the example of FIG. 2 as being housed in computing device 200, in other examples, memory 204 may be separate from computing device 200 but accessible to engines of computing device 200. Memory 204 may include any computer-readable storage medium including, but not limited to, volatile memory (e.g., RAM), and non-volatile memory (e.g., flash memory, EPRON, memristor, etc.). In some examples, memory 204 may be implemented by a hardware security device. Additionally, memory 204 may be implemented by a database.

In some examples, memory 204 may be implemented by separate machine-readable storage mediums and the information identifying the protected computing device, the unique identifier, and the key may each be stored in different mediums. Additionally, in some examples where these three pieces of information are stored in different mediums, a key identifier number may be used to identify the key independently from the unique identifier. For example, the unique identifier and the information identifying the protected computing device may be stored on a first database. The key may be stored on a second database in a manner that is associated to the key identifier number. The key identifier number is then stored in a third database along with the unique identifier and the information identifying the protected computing device. Separate storage of the key in this manner may allow for increased security of the key. This is described in more detail in relation to computing device 600 of FIG. 6.

Request engine 202 is an engine of computing device 200 that includes a combination of hardware and software that allows computing device 200 to receive a key request from requester 232. In some examples, the key request comprises a unique identifier and information identifying the requester.

In some examples, and as discussed above in relation to instructions 113, request engine 202 may allow computing device 200 to receive the key request over an encrypted communication session. Non-limiting examples include TLS, SSL, IPSec, etc. Thus, as discussed above in relation to instructions 113, request engine 202 may allow computing device 200 to allow request engine 202 and requester 232 to take steps that establish the privacy of the connection before the exchange. For example, with TLS, request engine 202 may allow computing device 200 to exchange and negotiate cipher suites (ciphers and hash functions) to be used to encrypt data exchanged. Accordingly, request engine 202 may allow computing device 200 to pick a cipher and hash function from a list of cipher and hash functions provided by requester 232.

In some examples, the key request received by request engine 202 may include information identifying the requester 232 from which the key request is coming from and a unique identifier associated with the encrypted disk partition.

Thus, in some examples, as part of receiving the key request, request engine 202 may allow computing device 200 to send a CertificateRequest message to requester 232 to ask for and receive a certificate from requester 232. The certificate may include information that identifies the requester. In some examples, different components of the key request may be received at different times. For example, the information identifying the requester may be received at a different time than the unique identifier associated with the encrypted disk partition.

Validation engine 203 is an engine of computing device 200 that includes a combination of hardware and software that allows computing device 200 to determine a validity of the key request received by request engine 202.

In some examples, validation engine 203 may determine a validity of the key request by comparing the information identifying the protected computing device 231 and the information identifying the requester 232. For example, the information identifying the protected computing device 231 and the information comparing the information identifying the requester 231 may indicate that the protected computing device and the requester are the same computing device. Accordingly, validation engine 203 may determine that a key request is valid based, at least in part, on the key request being from the same computing device as the computing device that registered the key.

In some examples, there may be multiple protected computing devices that have registered keys associated with unique identifiers, each protected computing device with its own information to identify itself. In these examples, validation engine 203 may compare the information identifying the requester (for a specific key request) with the information that identifies each protected computing device to determine a validity of the key request. For example, validation engine 203 may determine that the key request from a specific requester is valid because the requester is one of the protected computing devices that registered with computing device 200.

In some examples, validation engine 203 may determine that a key request is valid based, at least in part, on the unique identifier being associated with the requester. For example, a requester may be one of the protected computing devices that registered with computing device 200. However, a requester may request a key for an encrypted disk partition that is associated with another protected computing device. In other words, the unique identifier is not associated with the requester. Validation engine 203 may determine a validity of the key request by determining that the unique identifier is or is not associated with the requester. Validation engine 203 may do this by querying the memory 204, which has stored in it each protected computing device and the unique identifier associated with each protected computing device, as discussed above. Thus, validation engine 203 may determine that a requester is a specific protected computing device and determine that the unique identifier that is included in the key request is associated with the requester.

In some examples, validation engine 203 may determine that a key request is valid based, at least in part, on a number of previous key requests for the same unique identifier. In some examples, validation engine 203 may determine a validity based on the total count of the number of previous key requests. For example, unique identifier ABC has been requested 1000 times before the most current request for unique identifier ABC. The numerous requests for the same unique identifier ABC before the current request may indicate that a bad actor is trying to unsuccessfully gain access to the information stored on the encrypted disk partition that is identified by unique identifier ABC. Validation engine 203 may determine that 1000 times indicates that the current key request is not valid. In some examples, the count may not be a total count but a partial count over a specific time frame (a count over the last ten minutes, etc.) In some examples, a number of previous key requests may also include a pattern or characteristic of the previous key requests. For example, validation engine 203 may determine that a high frequency of request for the same unique identifier indicates that a key request is invalid. In some examples, validation engine 203 may compare the frequency for a specific unique identifier with the frequency for another unique identifier. A higher frequency for the specific unique identifier may indicate that the key request for the specific unique identifier is not valid.

In some examples, the frequency may be associated with the requestor. As discussed above in relation to instructions 113, this may be because a booting computing device may boot up with a certain frequency. A requestor that requests keys associated with a specific unique identifier with a frequency that is faster than the certain frequency that a booting computing device may boot up may not be a genuine booting computing device, but a bad actor.

Additionally, as discussed above in relation to instructions 113, validation engine 203 may determine a validity of a key request based, at least in part, on a pattern of previous keys requests. For example, a computing device that is in a normal boot-up process may require keys to partitions that are non-linear. Thus, a requestor 232 that is requesting UUIDs in a linear fashion is not representative of the normal boot-up process. Thus, based, at least in part, on the pattern of previous key requests for the unique identifier, validation engine 203 may determine that the current key request for the unique identifier is not valid.

Accordingly, validation engine 203 may also include a memory that may store a count of each time a unique identifier is included in a key request, the requestor making the key request (i.e. storing the information identifying the requestor 232), and a time at which the request was requested.

Validation engine 203 may also allow computing device 200 to send the key to the requestor based on the determination of the validity of the key request. In some examples, validation engine 203 may use the same encrypted communication session established by request engine 202 that is used to receive the key request. Validation engine 203 may fetch the key from memory 204 using the unique identifier.

While computing device 200 of FIG. 2 is shown to communicate with one protected computing device 231, computing device 200 may communicate with and handle numerous registration requests from numerous protected computing devices. Additionally, while computing device 200 of FIG. 2 is shown to communicate with one requestor 232, computing device 200 may interact with and handle numerous key requests from numerous requestors.

In some examples, computing device 200 may include a transfer engine. The transfer engine is an engine of computing device 200 that includes a combination of hardware and software that allows computing device 200 to transfer the stored key material in memory 204 to a secondary computing device. As used herein, a secondary computing device may include a controller node that is used in a cloud network. For example, computing device 200 may be the initial installer that receives the initial registration. Transfer engine 204 may establish connection with secondary computing device and send the keys and associated unique identifiers to secondary computing device. Secondary computing device may then "take over" for computing device 200 in handling subsequent registration requests and key requests. In a cloud network, there may be multiple secondary computing devices to enable high availability.

Computing device 200 of FIG. 2, which is described in terms of functional engines containing hardware and software, may include one or more structural or functional aspects of computing device 100 of FIG. 1, which is described in terms of processors and machine-readable storage mediums. Computing device 200 may also include one or more structural or functional aspects of computing device 600 of FIG. 6.

Figure 3:
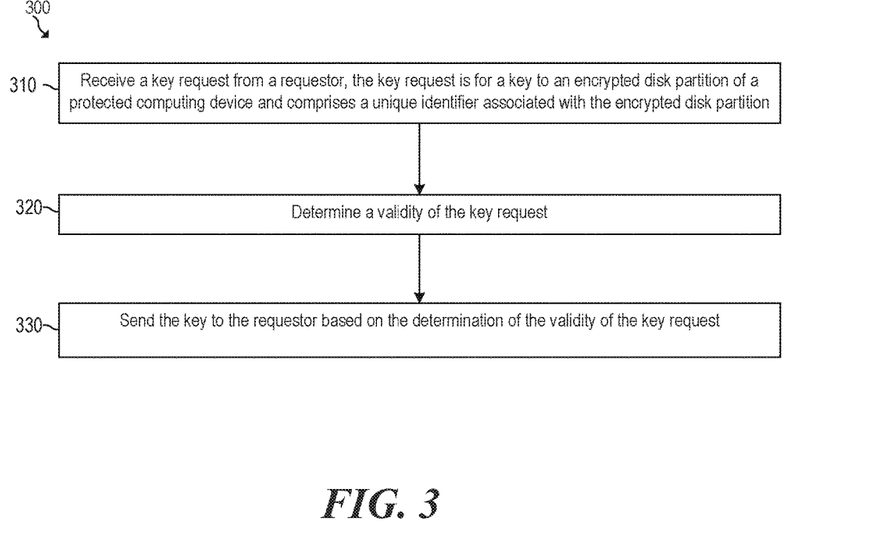
FIG. 3 is a flowchart of a method of sending to a requestor a key for an encrypted disk partition, according to some examples.

FIG. 3 illustrates a flowchart for an example method 300 to send a key for an encrypted disk partition. Although execution of method 300 is described below with reference to computing device 100 of FIG. 1, other suitable systems for execution of method 300 may be utilized (e.g., computing device 200 or computing device 600). Additionally, implementation of method 300 is not limited to such examples and method 300 may be used for any suitable device or system described herein or otherwise.

At 310 of method 300, processing resource 101 may execute instructions 111 to receive a key request from a requestor. The key request received at 310 is for a key to an encrypted disk partition of a protected computing device and comprises a unique identifier that is associated with the encrypted disk partition. At 320, processing resource 101 may execute instructions 112 to determine a validity of the key request received at 310. As discussed above, in some examples, instructions 112 may include instructions to determine a validity of the key request based on a number of previous key requests for the unique identifier included in the key request. This may include a total count of the previous key requests, a frequency of previous key requests, a pattern of previous key requests, etc. and/or a combination thereof. Thus, at 320, processing resource 101 may determine a validity of the key request based, at least in part, on these factors.

At 330, processing resource 101 may execute instructions 330 to send the key to the requester based on the determination made at 320. Although the flowchart of FIG. 3 shows certain functionalities as occurring in one step, the functionalities of one step may be completed in at least one step (e.g., in multiple steps).

Figure 4:
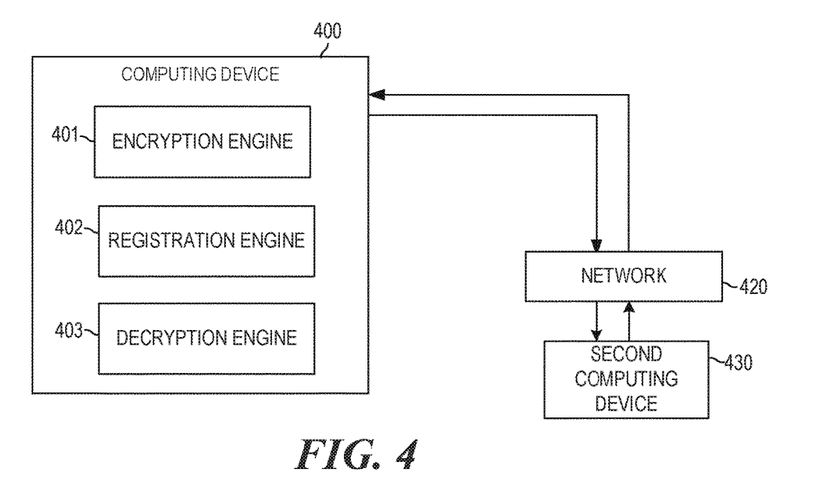
FIG. 4 is a block diagram of a computing device to request a key for an encrypted disk partition, according to some examples.

FIG. 4 is a block diagram of a computing device 400 to request a key for an encrypted disk partition. Computing device 400 may be a server, computer networking device, chip set, desktop computer, workstation, or any other processing device or equipment. In some examples computing device 400 may communicate with a second computing device 430 over network 420. In some examples, computing device 400 may be a host server in an enterprise. In some examples, computing device 400 may use a specific type of operating system (e.g., Linux) and may be considered a Linux server.

Computing device 400 includes encryption engine 401, registration engine 402, and decryption engine 403. Each of these aspects of computing device 400 will be described below. Other engines may be added to computing device 400 for additional or alternative functionality.

Each of engines 401, 402, 403, and any other engines, may be any combination of hardware (e.g., a processor such as an integrated circuit or other circuitry) and software (e.g., machine or processor-executable instructions, commands, or code such as firmware, programming, or object code) to implement the functionalities of the respective engine. Such combinations of hardware and programming may be implemented in a number of different ways. A combination of hardware and software can include hardware (i.e., a hardware element with no software elements), software hosted at hardware (e.g., software that is stored at a memory and executed or interpreted at a processor), or hardware and software hosted at hardware. Additionally, discussed above, the singular forms "a," "an," and "the" include plural referents unless the context clearly dictates otherwise. Thus, for example, the term "engine" is intended to mean at least one engine or a combination of engines. In some examples, computing device 400 may include additional engines.

Each engine of computing device 400 can include at least one machine-readable storage mediums (for example, more than one) and at least one processing resource (for example, more than one). For example, software that provides the functionality of engines on computing device 400 can be stored on a memory of a computer to be executed by a processing resource of the computer. In some examples, each engines of computing device 400 may include hardware in the form of a microprocessor on a single integrated circuit, related firmware, or other software for allowing microprocessor to operatively communicate with other hardware of computing device 400.

Encryption engine 401 is an engine of computing device 401 that includes a combination of hardware and software that allows computing device 400 to encrypt its disk. Thus, encryption engine 401 may allow computing device 401 to encrypt its entire disk, or a portion of its disk. Encryption engine 401 may also allow computing device 401 to assign unique identifiers to each encrypted partition and to generate a key for each encrypted partition. In examples where encryption engine 401, registration engine 402, and/or decryption engine 403 uses instructions executable by a processing resource (such as software) to implement its functionalities, encryption engine 401 does not encrypt these portions. For example, software for encryption engine 401, registration engine 402, and/or decryption engine 403 may reside in a separate portion of memory (e.g. a pre-boot region of memory) that is not encrypted.

Registration engine 402 is an engine of computing device 400 that includes a combination of hardware and software that allows computing device 400 to send a registration request to the second computing device 430. In some examples, the request and information in the request are sent over an encrypted communication session, as discussed above. Thus, registration engine 402 may allow computing device 400 to send the registration request over an encrypted communication session. Non-limiting examples include TLS, SSL, IPSec, etc. Thus, registration engine 402 may allow computing device 400 to take steps to establish the privacy of the connection before the exchange. For example, with TLS, registration engine 402 may negotiate cipher suites to be used to encrypt the data exchanged, thus allowing computing device 400 to send a list of cipher and hash functions to second computing device 430.

In some examples, computing device 400 and second computing device 430 may communicate through network 420. In these examples, registration engine 402 may allow computing device 400 to locate second computing device 430 through an address of computing device 430. For example, registration engine 402 may include or be presented with (e.g., by a PXE server) an Internet protocol (IP) address of second computing device 430. Using this IP address, registration engine 402 may find second computing device 430 over network 420.

In some examples, the registration request sent to second computing device 430 by computing device 400 may include information identifying computing device 400. In some examples using TLS, this may be done in response to second computing device 430 sending a CertificateRequest message asking for a certificate from computing device 400. The certificate sent by computing device 400 may include information that identifies computing device 400.

Registration engine 402 may allow computing device 400 to send a key and the unique identifier associated with the encrypted disk partition to second computing device 430. As discussed above, this is done over the encrypted communication session (e.g., TLS, etc.). In some examples, registration engine 402 may receive a confirmation from second computing device 430 that second computing device 430 has received and stored the key and the associated unique identifier.

Decryption engine 403 is an engine of computing device 400 that includes a combination of hardware and software that allows computing device 400 to send a key request to the second computing device and to receive the key from the second computing device.

In some examples, computing device 400 and second computing device 430 may communicate through network 420. In these examples, decryption engine 403 may allow computing device 400 to locate second computing device 430 through an address of computing device 430. For example, decryption engine 403 may have or be presented with the IP address of second computing device 430. Using the IP address, decryption engine 403 may connect with second computing device 430 and establish the encrypted communication session. For example, in examples where computing device 400 is a Linux server that is re-booting after initial provisioning, decryption engine 403 may be implemented by an initial RAM disk (initrd). The initrd may include a kernel of an operating system, instructions (e.g. software) to contact second computing device 430 to send a key request, and ports for connection. In some examples, the initrd may include an IP address of second computing device 430. In some examples, the initrd does not include an IP address, but rather, the IP address is provided as a parameter that is served to computing device 400 by a pre-boot environment computing device (e.g., PXE server). In some examples, the initrd may also include information that identifies computing device 400.

In some examples, decryption engine 403 may allow computing device 400 to send the key request over an encrypted communication session. Non-limiting examples include TLS, SSL, IPSec, etc. Thus, decryption engine 403 may allow computing device 400 to take steps to establish the privacy of the connection before the exchange. For example, with TLS, decryption engine 402 may negotiate cipher suites to be used to encrypt the data exchanged, thus allowing computing device 400 to send a list of cipher and hash functions to second computing device 430. The encrypted communication session established by decryption engine 403 with second computing device 430 may be different from the encrypted communication session established by registration engine 402 with second computing device 430. Thus, the encrypted communication session established by decryption engine 403 may be characterized as a "second" encrypted communication session and the encrypted communication session established by registration engine 402 may be characterized as a "first" encrypted communication session to reflect different sessions.

In some examples, the key request sent by decryption engine 403 may include information identifying the computing device 400 to second computing device 430. In some examples using TLS, this may be done in response to second computing device 430 sending a CertificateRequest message asking for a certificate from computing device 400. The certificate sent by computing device 400 may include information that identifies computing device 400 (e.g., this may be included in the initrd, as discussed above).

The key request sent by decryption engine 403 may also include a unique identifier for the specific encrypted disk partition for which a key is requested by computing device 400. Decryption engine 403 may also allow computing device 400 to receive the key from second computing device 430. In some examples, the key is received over the encrypted communication session established by decryption engine 403, as discussed above. The key may be used by decryption engine 403 as an input to access the encrypted disk partition.

Figure 5:
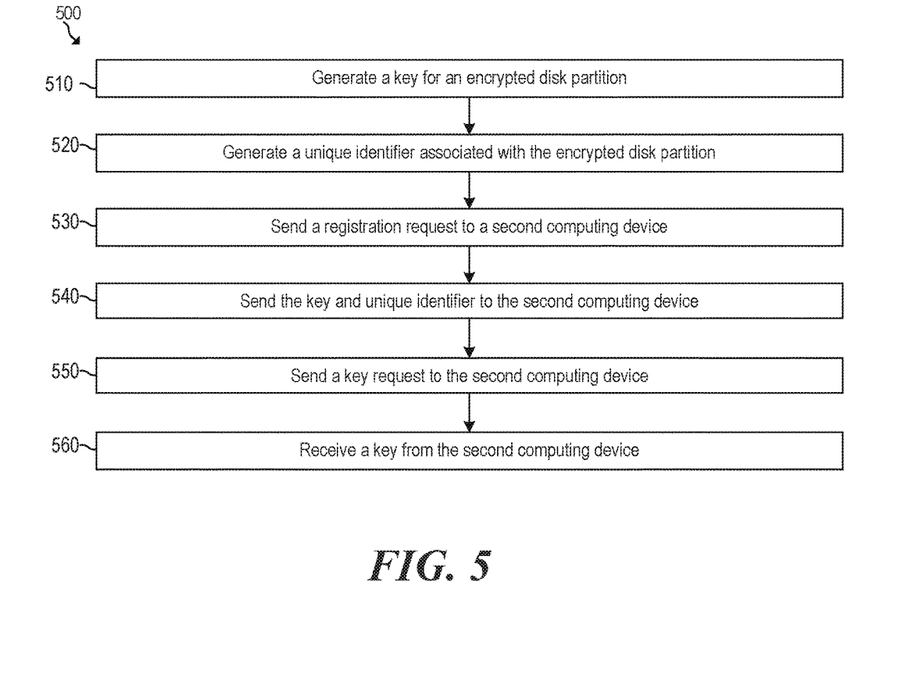
FIG. 5 is a flowchart of a method of requesting a key for an encrypted disk partition, according to some examples.

FIG. 5 illustrates a flowchart for an example method 500 to request a key for an encrypted disk partition. Although execution of method 500 is described below with reference to computing device 400 of FIG. 4, other suitable systems for execution of method 400, described herein or otherwise, may be utilized.

At 510 of method 500, encryption engine 401 may generate a key for an encrypted disk partition of computing device 400. At 520, encryption engine 401 may generate a unique identifier that is associated with the encrypted disk partition. As discussed above, the unique identifier may comprise a universally unique identifier. At 530 of method 500, registration engine 402 may send a registration request to second computing device 430. In some examples, at 530, registration engine 402 may establish an encrypted communication session with second computing device 430 to send the registration request. Additionally, in some examples, at 530, registration engine 402 may rely on an address of second computing device to connect with second computing device 430. For example, where computing device 400 is a Linux computing device, the IP address of second computing device 430 may be included in registration engine 402 or provided to registration engine 402. In some examples, the registration request may include information identifying the computing device 400.

At 540 of method 500, registration engine 402 may send the key generated by encryption engine 401 at 510 to the second computing device 430. Registration engine 402 may also send the unique identifier generated by encryption engine 401 at 510 to the second computing device 430. At 550 of method 500, decryption engine 403 may send a key request to the second computing device 430. In some examples, at 550, decryption engine 403 may establish a second encrypted communication session with second computing device 430 to send the key request. Additionally, in some examples, at 550, decryption engine 403 may rely on an address of second computing device to connect with second computing device 430. For example, where computing device 400 is a Linux computing device, the IP address of second computing device 430 may be included in decryption engine 403 or provided to decryption engine 403. In some examples, the key request may include information identifying the computing device 400. At 560 of method 500, decryption engine 403 may receive a key from the second computing device 430. Decryption engine 403 may use the key to access the encrypted disk partition. For example, in Linux computing devices, the decryption engine 403 may include a Linux Unified Key Setup (LUKS) that may use the key to access the encrypted disk partition on the fly (i.e. decrypt as data is read from disk and encrypt as data is written to disk).

Although the flowchart of FIG. 5 shows certain functionalities as occurring in one step, the functionalities of one step may be completed in at least one step (e.g., in multiple steps).

Figure 6:
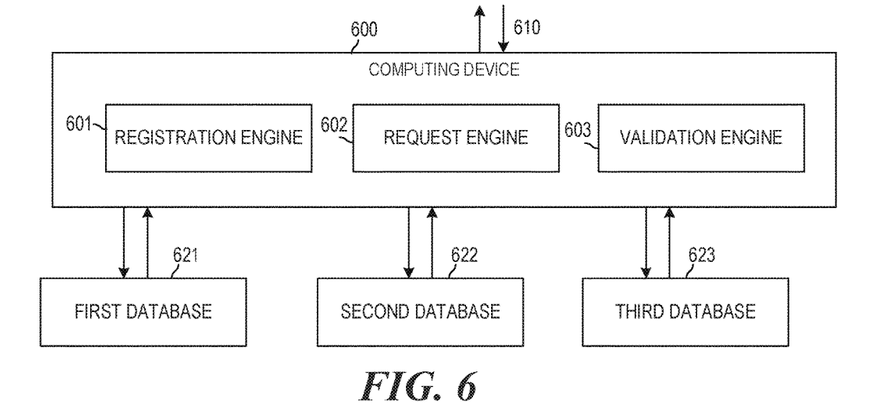
FIG. 6 is a computing device to store a key for an encrypted disk partition of a protected computing device, according to some examples.

FIG. 6 is a block diagram of a computing device 600 to store a key for an encrypted disk partition. Computing device 600, like computing device 200, may be a server, computer networking device, chip set, desktop computer, workstation, or any other processing device or equipment. In some examples computing device 600 may communicate with protected computing device and requestor, represented by arrows 610.

Computing device 600 includes registration engine 601, request engine 602, and validation engine 603. Other engines may be added to computing device 600 for additional or alternative functionality. Engines 601, 602, and 603 may interface with first database 621, second database 622, and third database 623 to store keys and other associated information.

Registration engine 601 is similar to registration engine 201 except that registration engine 601 accesses first database 621, second database 622, and third database 623 rather than memory 204 to store keys and unique identifiers received from requesters. Responsive to receiving a registration request from a protected computing device, information identifying the protected computing device, a key for an encrypted disk partition, and a unique identifier associated with the encrypted disk partition, registration engine 601 may store the information identifying the protected computing device and the unique identifier in first database 621. First database may be implemented by a machine readable storage medium. For example, first database 621 may be a configuration management database (CMDB). In some examples, first database 621 may be a repository that acts as a data warehouse that holds data relating to information technology assets and descriptive relationship between such assets. Thus, first database may store the relationship between a protected computing device and the encrypted disk partitions of the protected computing device.

Registration engine 601 may also store the key in second database 622. Second database 622 may be implemented by a machine readable storage medium. Second database 622 may return a key identifier number to computing device 600 that is associated with the key stored in second database 622. In some examples, second database may be a hardware security device, as described above.

Registration engine 601 may store the key identifier number, information identifying the protected computing device, and the unique identifier in third database 623. Third database may be implemented by a machine readable storage medium.

First database 621, second database 622, and/or third database 623 may be housed on computing device 600 or may be storage mediums that are accessible to registration engines 601, request engine 602, and validation engine 603 of computing device 600.

Request engine 602 is similar to request engine 202. Thus, the discussion above in relation to request engine 202 is applicable to request engine 602.

Validation engine 603 is similar to validation engine 203, except that validation engine 603 accesses first database 621, second database 622, and third database 623 to determine a validity of the key request and to send the key based on the determination.

Responsive to request engine 602 receiving a key request, validation engine 603 queries first database 621 (which stores the mapping between unique identifiers and protected computing devices) to determine whether the requestor is associated with the unique identifier. Validation engine 603 may base the determination of a validity of the key request in part, on this determination and others described above in relation to validation engine 203 and instructions 112 (e.g., based on previous key requests for the same unique identifier, etc.) Responsive to determining that a key request is valid, validation engine 603 may fetch the key identifier number from the third database 623 based on the unique identifier. Based on the key identifier number, validation engine 603 may fetch the key from the second database 622. Storage of the key separate from the unique identifier in this manner may allow for increased security of the key as compared to storage of the key and unique identifier together (e.g. as described in relation to FIG. 2).

Figure 7:
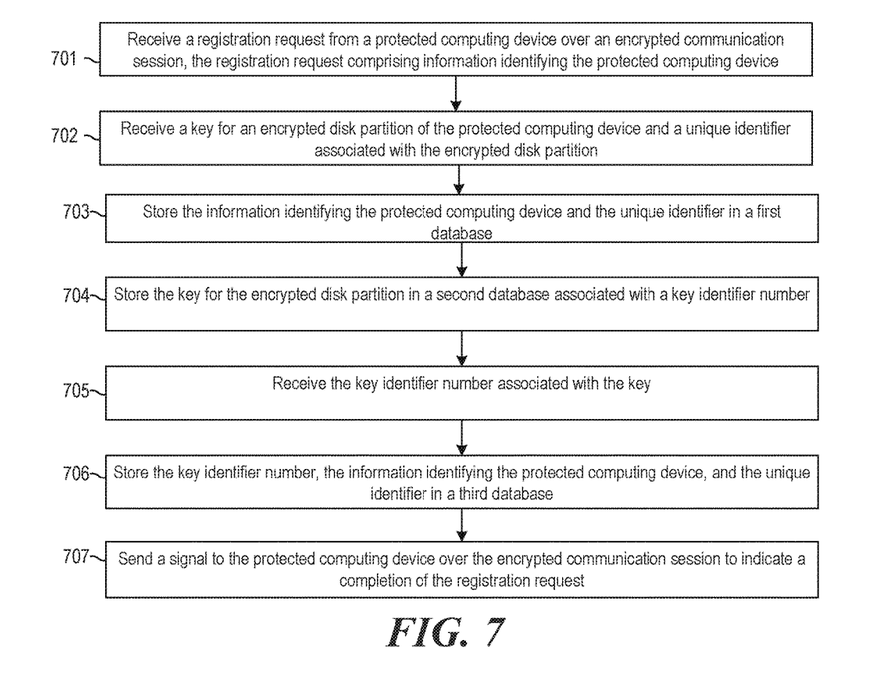
FIG. 7 is a flowchart of a method of registering a key for an encrypted disk partition, according to some examples.

FIG. 7 illustrates a flowchart for an example method 700 of storing a key and associated information in multiple databases. Although execution of method 700 is described below with reference to computing device 600, other suitable systems for execution of method 700 (e.g., computing device 100, computing device 200) may be utilized. Additionally, implementation of method 700 is not limited to such examples and method 700 may be used for any suitable device or system described herein or otherwise.

At 701 of method 700, registration engine 601 receives a registration request from a protected computing device over an encrypted communication session (e.g., TLS, etc.). In some examples, the registration request comprises information that identifies the protected computing device. At 702, registration engine 601 receives a key for an encrypted disk partition of the protected computing device and a unique identifier associated with the encrypted disk partition.

At 703 of method 700, registration engine 601 may store the information identifying the protected computing device and the unique identifier (received at 701) in first database 621. The unique identifier may be stored in a manner that maps the unique identifier to the stored information identifying the protected computing device.

At 704 of method 700, registration engine 601 may store the key for the encrypted disk partition received at 702 in second database 622. The key may be stored in a manner that associates the key to a key identifier number. At 705 of method 700, registration engine 601 receives the key identifier number that is associated with the key stored at 704. At 706 of method 700, registration engine 601 stores the key identifier number (received at 705), the information identifying the protected computing device (received at 701), and the unique identifier (received at 702) in third database 623. At 707 of method 700, registration engine 601 sends a signal to the protected computing device over the encrypted communication session to indicate that the registration request is completed.

Although the flowchart of FIG. 7 shows certain functionalities as occurring in one step, the functionalities of one step may be completed in at least one step (e.g., in multiple steps). Additionally, although the flowchart of FIG. 7 shows a specific order of performance of certain functionalities, method 700 is not limited to that order. For example, some of the functionalities shown in succession in the flowchart may be performed in a different order, may be executed concurrently or with partial concurrence, or a combination thereof. For example, 703 and 704 may be performed with partial concurrence. In some examples, functionalities described herein in relation to FIG. 7 may be provided in combination with functionalities described herein in relation to any of FIGS. 1-6 and 8.

Figure 8:
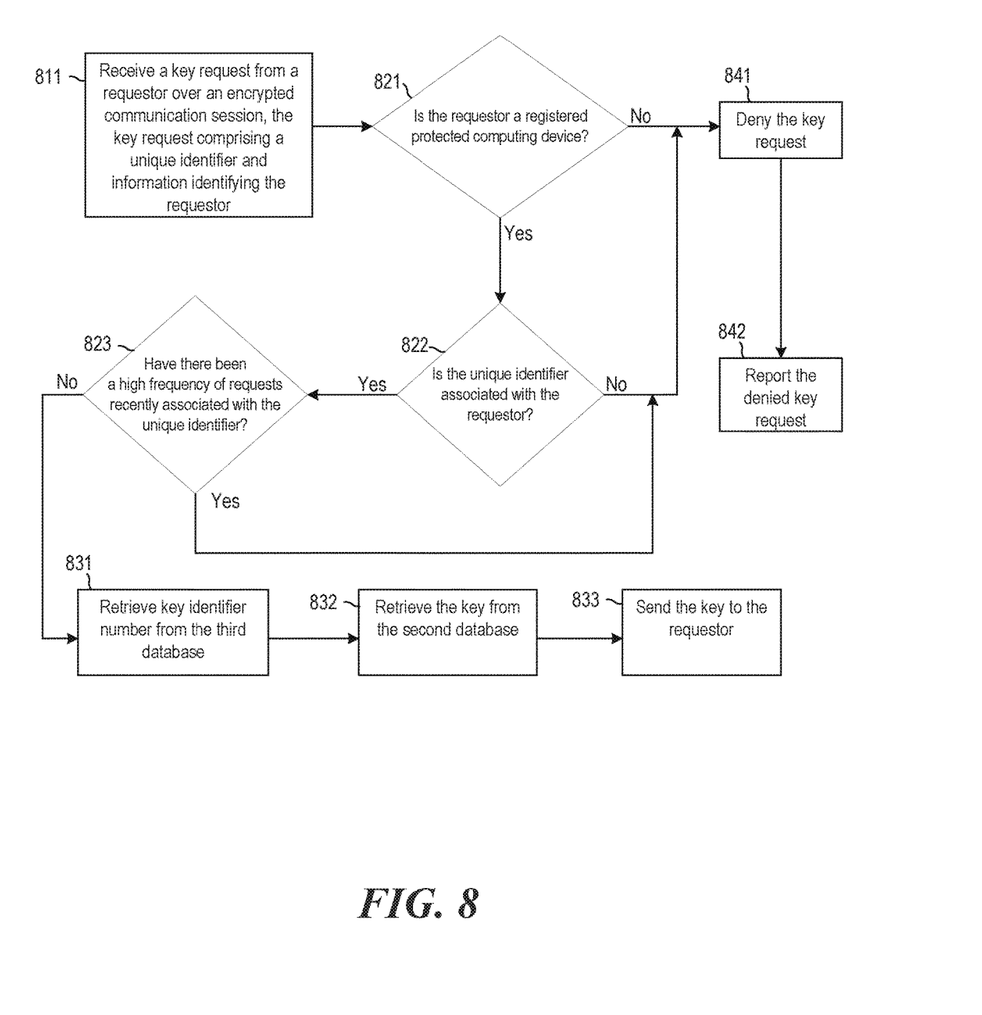
FIG. 8 is a flowchart of a method of validating a key request for an encrypted disk partition, according to some examples.

FIG. 8 illustrates a flowchart for an example method 800 of validating a key request for an encrypted disk partition. Although execution of method 800 is described below with reference to computing device 600, other suitable systems for execution of method 800 (e.g., computing device 100, computing device 200) may be utilized. Additionally, implementation of method 800 is not limited to such examples and method 800 may be used for any suitable device or system described herein or otherwise.

At 811 of method 800, request engine 602 of computing device 600 may receive a key request from a requestor over an encrypted communication session. In some examples, the encrypted communication session may be TLS. Thus, in some examples, at 811, request engine 602 may establish a TLS connection with the requestor. In some examples, the key request may comprise a unique identifier and information that identifies the requestor.

At 821 of method 800, validation engine 603 determines if the requestor is a registered protected computing device. As discussed above, validation engine 603 may do this by comparing the information identifying the requestor received at 811 with information that identifies protected computing devices. For example, validation engine 603 may query first database 621 to determine if the information identifying the requestor matches information that identifies a protected computing device. Responsive to a determination that the requestor is not a registered protected computing device, method proceeds to 841 and validation engine 603 denies the key request.

Responsive to a determination that the requestor is a registered protected computing device, method proceeds to 822 and validation engine determines if the unique identifier is associated with the requestor. As discussed above, validation engine 603 may do this by determining whether the unique identifier included in the key request is mapped to the requestor in first database 621.

Responsive to a determination that the unique identifier is not associated with the requestor, method proceeds to 841 and validation engine 603 denies the key request.

Responsive to a determination that the unique identifier is associated with the requester, method 800 proceeds to 823. At 823 of method 800, validation engine 800 determines if there have been a high frequency of requests recently associated with the unique identifier. Responsive to a determination that there have been a high frequency of requests associated with the unique identifier, method proceeds to 841 and validation engine 603 denies the key request. In some examples, and as discussed above in relation to validation engine 203 and instructions 112, a high frequency may be characterized by a frequency of requests associated with a unique identifier that exceeds a frequency of a normal booting computing device.

Responsive to a determination at 823 that there have not been a high frequency of requests recently associated with the unique identifier, method proceeds to 831. At 831, validation engine 603 retrieves the key identifier number from third database 623. At 832, validation engine 603 retrieves the key from the second database 622 based on the key identifier number. At 833, validation engine 603 sends the key to the requestor.

In situations where the key request is denied at 841, method 800 may proceed to 842. At 842, validation engine 603 may report the denied key request to a user of the protected computing device as this may indicate that a bad actor is trying to gain access to the keys for the protected computing device.

Although the flowchart of FIG. 8 shows certain functionalities as occurring in one step, the functionalities of one step may be completed in at least one step (e.g., in multiple steps). Additionally, although the flowchart of FIG. 8 shows a specific order of performance of certain functionalities, method 800 is not limited to that order. For example, some of the functionalities shown in succession in the flowchart may be performed in a different order, may be executed concurrently or with partial concurrence, or a combination thereof. For example, 822 and 823 may be performed with partial concurrence. In some examples, functionalities described herein in relation to FIG. 8 may be provided in combination with functionalities described herein in relation to any of FIGS. 1-7.

All of the features disclosed in this specification (including any accompanying claims, abstract and drawings), and/or all of the elements of any method or process so disclosed, may be combined in any combination, except combinations where at least some of such features and/or elements are mutually exclusive.

What is claimed is:

1. A non-transitory machine-readable storage medium comprising instructions executable by a processing resource, the instructions comprising:
    instructions to receive a key request from a requestor, wherein the key request is for a key to an encrypted disk partition of a protected computing device and comprises a unique identifier associated with the encrypted disk partition, and wherein the key request is one of a plurality of key requests received from the requestor;
    instructions to determine a validity of the key request, wherein the determination of the validity of the key request is based on a number of previous key requests comprising the unique identifier; and
    instructions to identify a pattern of requests indicative of a normal boot-up process;
    instructions to identify a received pattern for the plurality of key requests received from the requestor;
    instructions to determine if the received pattern is the same as the pattern of requests indicative of a normal boot-up process;
    in response to determining the received pattern is different from the pattern of requests indicative of a normal boot-up process, instructions to determine the key request is invalid;
    instructions to send the key to the requestor based on the determination of the validity of the key request;
    instructions to receive a registration request from the protected computing device, the registration request including information identifying the protected computing device;
    instructions to receive the unique identifier from the protected computing device;
    instructions to receive the key from the protected computing device;
    instructions to store the unique identifier with the information identifying the protected computing device on a first database;
    instructions to store the key on a second database;
    instructions to receive a key identification number; and
    instructions to store the key identification number, unique identifier, and information identifying the protected computing device on a third database,
    wherein the pattern of requests indicative of a normal boot-up process comprises a non-linear pattern of requests.

2. The non-transitory machine-readable storage medium of claim 1, the instructions comprising:
    instructions to receive a registration request from the protected computing device;
    instructions to receive the unique identifier associated with the encrypted disk partition from the protected computing device;
    instructions to receive the key to the encrypted disk partition from the protected computing device; and
    instructions executable by the processing resource to store the unique identifier and the key.

3. The non-transitory machine-readable storage medium of claim 1 wherein the instructions to determine the validity of the key request comprise instructions to determine that the unique identifier is associated with the requestor.

4. The non-transitory machine-readable storage medium of claim 2,
    wherein the unique identifier and the key are stored on a hardware security device; and
    wherein the instructions to send the key comprise instructions to retrieve the key from the hardware security device.

5. The non-transitory machine-readable storage medium of claim 2,
    wherein the unique identifier and the key are received from the protected computing device over a first encrypted communication session; and
    wherein the key request is received from the requestor over a second encrypted communication session.

6. The non-transitory machine-readable storage medium of claim 1, wherein the instructions to determine the validity of the key request comprise instructions to determine an identity of the requestor.

7. The non-transitory machine-readable storage medium of claim 1, wherein the instructions to determine the validity of the key request comprise instructions to compare the requestor to the information identifying the protected computing device that is stored on the first database.

8. The non-transitory machine-readable storage medium of claim 2, wherein the instructions comprise instructions to send the unique identifier and the key to a secondary computing device.

9. A computing device, comprising:
    a registration engine to receive a registration request from a protected computing device and to receive a key for an encrypted disk partition of the protected computing device and a unique identifier associated with the encrypted disk partition, wherein the registration request comprises information identifying the protected computing device;
    a request engine to receive a plurality of key requests comprise a key request from a requestor, the key request comprising the unique identifier and information identifying the requestor;
    a validation engine to determine validity of the key request and to send the key based on the determination of the validity of the key request, wherein the determination of the validity of the key request is based on a number of previous key requests comprising the unique identifier; and
    a memory comprising a first database, a second database, and a third database;
    wherein the validation engine is configured to determine validity of key requests by:

identifying a pattern of requests indicative of a normal boot-up process, wherein the pattern of requests indicative of a normal boot-up process comprises a non-linear pattern of requests;

identifying a received pattern for the plurality of key requests received from the requestor;

determining if the received pattern is the same as the pattern of requests indicative of a normal boot-up process;

in response to determining the received pattern is different from the pattern of requests indicative of a normal boot-up process, determining the key request is invalid; and in response to determining the received pattern is the same as the pattern of requests indicative of a normal boot up process, sending the key to the requestor;

wherein the registration engine is configured to store the key, the information identifying the protected computing device, and the unique identifier by:

storing the unique identifier with the information identifying the protected computing device on the first database;

instructions to store the key on the second database;

instructions to receive a key identification number; and instructions to store the key identification number, unique identifier, and information identifying the protected computing device on the third database.

10. The computing device of claim 9, wherein the validation engine is to determine the validity of the key request based on a comparison of the information identifying the protected computing device and the information identifying the requestor.

11. The computing device of claim 9, wherein the validation engine is to determine the validity of the key request based on a comparison of the information identifying the requestor and the unique identifier associated with the encrypted disk partition.

12. The computing device of claim 9, wherein the registration request is received over a transport layer security encrypted session.

13. The computing device of claim 9, wherein the key request is received over a transport layer security encrypted session.

14. The computing device of claim 9, wherein the validation engine is to determine the validity of the key request based on a pattern associated with the number of previous key requests comprising the unique identifier.

15. The computing device of claim 9, comprising a transfer engine to send the key, the information identifying the protected computing device, and the unique identifier to a secondary computing device.

* * * * *